United States Patent
Spiegl et al.

(10) Patent No.: US 12,196,166 B2
(45) Date of Patent: Jan. 14, 2025

(54) SOLENOID VALVE

(71) Applicant: Hoerbiger Wien GmbH, Vienna (AT)

(72) Inventors: Bernhard Spiegl, Vienna (AT); Lukas Waldner, Vienna (AT)

(73) Assignee: Hoerbiger Wien GmbH, Vienna (AT)

( * ) Notice: Subject to any disclaimer, the term of this patent is extended or adjusted under 35 U.S.C. 154(b) by 0 days.

(21) Appl. No.: 18/012,898

(22) PCT Filed: Jun. 23, 2021

(86) PCT No.: PCT/EP2021/067166
§ 371 (c)(1),
(2) Date: Dec. 23, 2022

(87) PCT Pub. No.: WO2021/260015
PCT Pub. Date: Dec. 30, 2021

(65) Prior Publication Data
US 2023/0265819 A1 Aug. 24, 2023

(30) Foreign Application Priority Data
Jun. 24, 2020 (AT) .............................. A50534/2020

(51) Int. Cl.
*F02M 63/00* (2006.01)
*F02M 21/02* (2006.01)
(Continued)

(52) U.S. Cl.
CPC .... *F02M 63/0015* (2013.01); *F02M 21/0254* (2013.01); *F02M 21/0269* (2013.01);
(Continued)

(58) Field of Classification Search
CPC ........... F02M 63/0015; F02M 21/0254; F02M 21/0269; F02M 61/166; F02M 61/20;
(Continued)

(56) References Cited

U.S. PATENT DOCUMENTS

2001/0007440 A1 7/2001 Oyama et al.
2003/0178509 A1 9/2003 Porter

FOREIGN PATENT DOCUMENTS

CN 208951390 U * 6/2019
DE 19638025 A1 * 3/1998 ......... F02M 51/0671
(Continued)

OTHER PUBLICATIONS

Austria Search Report for related patent application Au A50534/2020, prepared by the Austria Patent and Trademark Office and issued on Jan. 18, 2021, in German.

*Primary Examiner* — Mahmoud Gimie
(74) *Attorney, Agent, or Firm* — Dykema Gossett PLLC

(57) ABSTRACT

In order to provide a solenoid valve (1) with a valve housing (2), in which an electric coil (3) and a magnet armature (5) are arranged, and with a valve element (8) which can be actuated by the magnet armature (5) in an axial actuation direction for opening and closing the solenoid valve (1), wherein a valve lift of the valve element (8) can be limited in a simple manner, it is provided according to the invention that the coil (3) be arranged on a coil carrier (4), wherein an end section (4a), axially facing the magnet armature (5), of the coil carrier (4) is designed as an end stop for the magnet armature (5) in order to limit an axial movement of the magnet armature (5), and that the coil carrier (4) be formed from a plastic, wherein the coil (3) is at least partially integrated into the coil carrier (4).

15 Claims, 1 Drawing Sheet

(51) Int. Cl.
*F02M 61/16* (2006.01)
*F02M 61/20* (2006.01)

(52) U.S. Cl.
CPC .......... *F02M 61/166* (2013.01); *F02M 61/20* (2013.01); *F02M 2200/02* (2013.01); *F02M 2200/306* (2013.01); *F02M 2200/9015* (2013.01)

(58) Field of Classification Search
CPC ......... F02M 2200/02; F02M 2200/306; F02M 2200/9015
USPC ....................................................... 123/476
See application file for complete search history.

(56) References Cited

FOREIGN PATENT DOCUMENTS

| | | | | |
|---|---|---|---|---|
| DE | 10039078 | A1 | 2/2002 | |
| DE | 102011080802 | A1 * | 2/2013 | ............. F02D 41/20 |
| DE | 102012224240 | A1 | 6/2014 | |
| DE | 112012003736 | T5 | 7/2014 | |
| DE | 102014005437 | A1 | 10/2015 | |
| EP | 404336 | A * | 12/1990 | ........... F02M 51/066 |
| EP | 0404336 | A1 * | 12/1990 | ............. F02M 51/06 |
| EP | 1517341 | A2 | 3/2005 | |
| EP | 2320066 | A1 * | 5/2011 | ........... F02M 47/027 |
| EP | 3267028 | A1 * | 1/2018 | ........ F02M 21/0254 |
| EP | 3346122 | A1 | 7/2018 | |
| WO | 2016169708 | A1 | 10/2016 | |

* cited by examiner

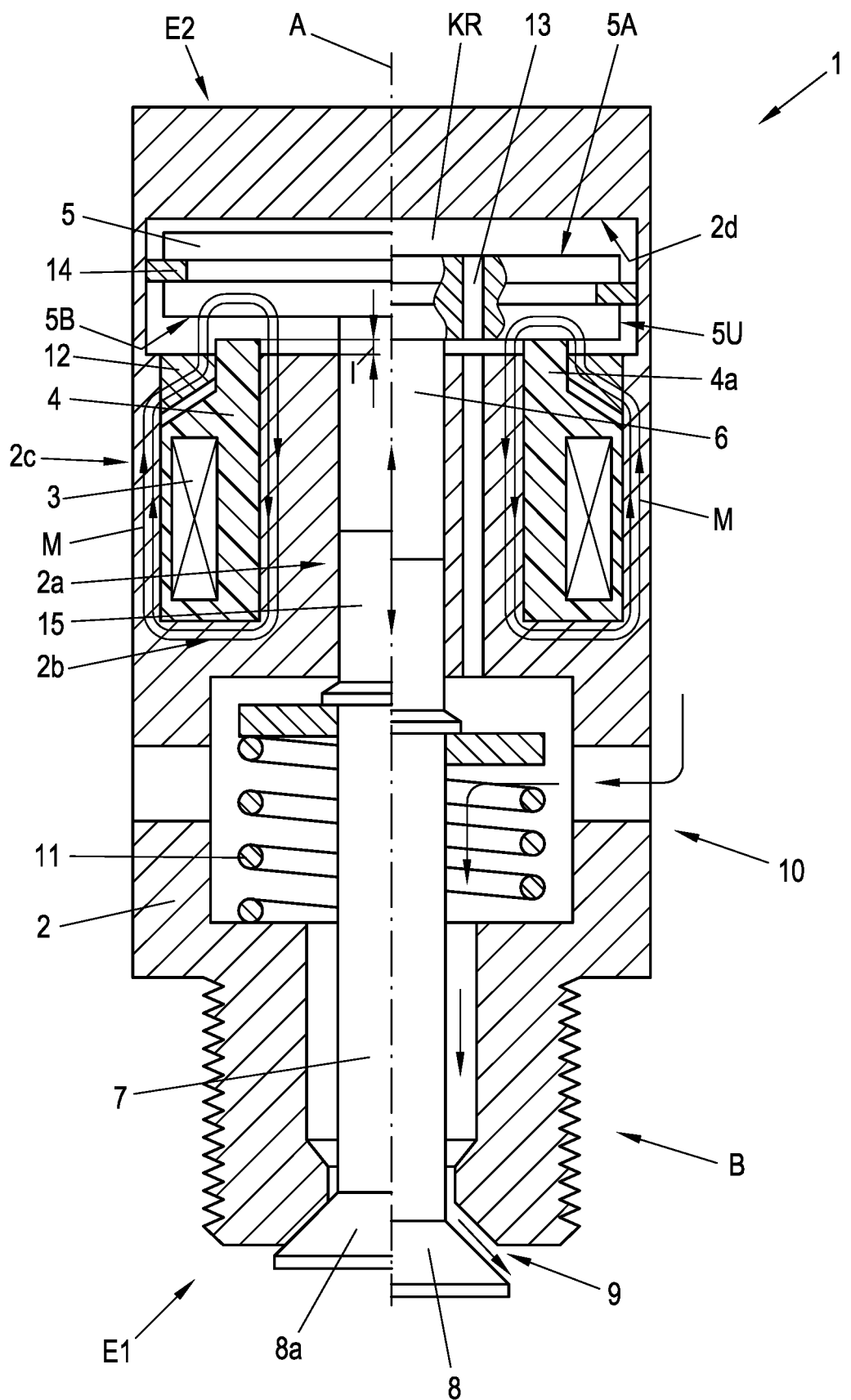

SOLENOID VALVE

CROSS-REFERENCE TO RELATED APPLICATION

This application is a national stage filing based upon International application No. PCT/EP2021/067166, filed 23 Jun. 2021, which claims the benefit of priority to Austria application No. A50534/2020, filed 24 Jun. 2020.

FIELD OF THE INVENTION

The invention relates to a solenoid valve with a valve housing, in which an electric coil and a magnet armature are arranged, and with a valve element that can be actuated by the magnet armature in an axial actuation direction for opening and closing the solenoid valve. The invention further relates to an internal combustion engine.

BACKGROUND

In internal combustion engines, electromagnetically actuatable injection valves are often used to supply liquid or gaseous fuels to a combustion chamber. Such valves are usually referred to as solenoid valves. Compared with conventional mechanically-actuated valves, solenoid valves have the advantage that very flexible valve control can be realized independently of the rotational speed of the internal combustion engine. For example, the opening time, the opening duration, and the valve lift can thereby be variably controlled, as a result of which the degrees of freedom in the metering of the fuel are increased. In large engines, and in particular large gas engines, a prechamber principle is frequently used in which the gaseous fuel is not fed directly to the combustion chamber, but, rather, to a prechamber upstream of the combustion chamber. The combustible gas/air mixture is then ignited in the prechamber, which generally takes place by means of spark plugs and/or by compression. Starting from the prechamber, the combustion propagates into the combustion chamber connected thereto. At a side, facing the combustion chamber or the prechamber when in a mounted state, of the solenoid valve, at least one valve opening is usually provided in the valve housing, which valve opening is closed by a valve element. By appropriately controlling the solenoid valve, the valve opening is released and closed in the desired manner in order to introduce a certain quantity of fuel into the combustion chamber or the prechamber.

Such solenoid valves normally have a valve housing in which an electric coil is arranged that can be supplied with energy in order to generate a magnetic field. Furthermore, a movable magnet armature is provided which is usually movable in the axial direction of the solenoid valve by the generated magnetic field. The valve element is usually connected to the magnet armature and is actuated by the magnet armature. If the solenoid valve is actuated by applying a voltage to the electric coil, the magnet armature and the valve element connected thereto are moved, and the valve opening is released in order to inject or blow the fuel into the combustion chamber or the prechamber. For this purpose, the fuel is normally pre-compressed to a certain pressure and is fed to the solenoid valve through a suitable feed opening. In most cases, a return spring is also provided in the solenoid valve, against which return spring the magnet armature is moved and which, after actuation of the solenoid valve, ensures that the valve opening is closed again even in the event of failure of the energy supply.

In order to limit the valve lift, i.e., the path which the valve element can follow, to a certain maximum value, lift limitation is generally integrated into the valve-usually in the form of one or more separate components. However, it is disadvantageous that these lift limiting devices require, on the one hand, a corresponding installation space in the valve, which is generally very limited anyway. In addition, the associated material and manufacturing effort is associated with additional costs, which is also disadvantageous. DE 10 2012 224240 A1 discloses, for example, a solenoid valve having a magnet assembly which has a coil and a magnetic core, and a magnet armature interacting therewith. The magnet assembly is arranged on a carrier element, which has an outer pole ring and an inner pole ring. A shoulder which serves as an armature stop can be provided on the side, facing the magnet armature, of the outer pole ring.

SUMMARY OF THE INVENTION

It is therefore an object of the invention to provide a solenoid valve which is constructed to be as simple and compact as possible, and in which the valve lift can be limited in a simple manner.

The object is achieved according to the invention in that the coil is arranged on a coil carrier, wherein an end section, axially facing the magnet armature, of the coil carrier is designed as an end stop for the magnet armature in order to limit axial movement of the magnet armature so as to limit a valve lift of the valve element, and that the coil carrier is formed from a plastic, wherein the coil is at least partially integrated into the coil carrier—for example, at least partially encapsulated with plastic. Preferably, the coil is completely integrated into the coil carrier—for example, encapsulated by the plastic. This creates a simple way to limit the valve lift, without the need for separate components.

When the solenoid valve is actuated, the coil preferably generates a magnetic flux which flows over a magnetically conductive valve housing outer wall of the valve housing to the magnet armature, wherein a magnetically conductive flux element is provided in the valve housing, said flux element introducing at least part of the magnetic flux flowing over the valve housing outer wall into an armature end face, facing the coil, of the magnet armature. As a result, the transverse forces acting on the magnet armature can be reduced, so that friction losses of the solenoid valve can be reduced.

In order to guide the magnetic flux in an advantageous manner into the magnet armature, the flux element is preferably arranged, transversely to the actuation direction, between the valve housing outer wall and the end section of the coil carrier and, in the actuation direction, between the coil and the magnet armature.

The flux element is preferably designed as a flux ring, and particularly preferably as a closed flux ring. The magnetic flux can thereby be advantageously introduced into the magnet armature at any point in the circumferential direction. In addition, a flux ring can be easily produced.

The flux element preferably has a higher magnetic conductivity than the valve housing outer wall, so that the magnetic resistance is reduced, and the largest possible proportion of the magnetic flux can be guided into the end face of the magnet armature.

It has proven to be particularly advantageous if the flux element has a cross-section in the form of a trapezoid, and preferably a rectangular trapezoid, because a large contact surface with the valve housing outer wall can thereby be formed.

Advantageously, the valve housing forms a cylinder in the region of the magnet armature, and the magnet armature forms a piston which is axially movable in the cylinder, wherein, in the actuation direction, a compression space is formed between a first armature end face, facing away from the coil, of the magnet armature and an opposite valve housing wall, wherein at least one throttle opening is arranged in the magnet armature and connects the first armature end face to an opposite, second armature end face. A pneumatic damper is thereby formed which reduces the speed at which the valve element strikes the valve seat.

Preferably, a sealing element for sealing the compression space is arranged on the peripheral surface of the magnet armature in order to improve the effect of the damper.

Preferably, a valve opening is provided in an axial end of the valve housing, and at least one feed opening for a preferably gaseous medium is provided in the valve housing and, within the valve housing, is connected to the valve opening. As a result, the solenoid valve can advantageously be used as a gas injection valve for an internal combustion engine.

Preferably, the magnet armature has an armature shaft, and the valve element has a valve shaft which is separate from the armature shaft, wherein, when the solenoid valve is actuated, the magnet armature actuates the valve shaft via the armature shaft. This decouples the movement of the magnet armature from the valve element during the closing movement of the solenoid valve, whereby the wear of the valve element and the valve seat can be reduced.

Preferably, a buffer element made of plastic is arranged between the armature shaft and the valve shaft. As a result, direct contact between the armature shaft and the valve shaft is avoided, whereby the noise generation and the wear can be reduced.

In order to reduce the friction losses of the solenoid valve, it is advantageous if the buffer element is formed from a tribologically-optimized plastic, and preferably from a plastic that contains polytetrafluoroethylene (PTFE).

Preferably, a spring element is arranged in the valve housing and exerts a restoring force on the valve element in order to hold the valve element in the closed position when the solenoid valve is in the non-actuated state. This ensures that the valve is always closed as soon as the energy supply of the coil is interrupted.

The object is further achieved by an internal combustion engine with a cylinder head and with at least one combustion chamber, in that at least one solenoid valve according to the invention is arranged on the cylinder head in order to supply a preferably gaseous fuel to the combustion chamber or a prechamber upstream of the combustion chamber.

BRIEF DESCRIPTION OF THE DRAWINGS

The present invention is described in greater detail below with reference to FIG. 1, which shows an advantageous embodiment of the invention by way of example, schematically and in a non-limiting manner. The drawing shows:

FIG. 1 a sectional view of an electromagnetically actuatable actuator in the form of a valve.

DETAILED DESCRIPTION

FIG. 1 shows an advantageous embodiment of the solenoid valve 1 according to the invention. The shown solenoid valve 1 is designed as a dry-running solenoid valve 1, and is provided for injecting a gaseous fuel into the combustion chamber or a prechamber, upstream of the combustion chamber, of an internal combustion engine (not shown). The solenoid valve 1 has a valve housing 2 which here is designed to be substantially cylindrical and has a valve axis A. To the left of the valve axis A, the solenoid valve 1 is shown in the closed state, and, to the right of the valve axis A, in the open state. At a first axial end E1 of the valve housing 2, a fastening section B is provided—in this case, in the form of a thread with which the solenoid valve 1 can be fastened to a cylinder head (not shown) of an internal combustion engine. Of course, other types of fastening would also be possible.

An electric coil 3 is provided in the valve housing 2 and runs annularly around the central valve axis A. The coil 3 can be supplied with energy in the form of an electrical voltage or an electrical current via suitable electrical terminals (not shown) in order to generate an (electro) magnetic field in a known manner. Depending upon the structural design of the solenoid valve 1, the terminals can be provided, for example, radially on the outside of the valve housing 2 or on a second axial end E2, opposite the first axial end E1, of the valve housing 2. However, the coil 3 does not have to be designed in one piece; instead, several coil segments which are electrically connected could also be arranged to be distributed around the valve axis A.

The coil 3 is arranged on a coil carrier 4, which in this case, substantially analogously to the coil 3, is designed in the shape of a ring and is arranged in an annular opening provided for this purpose in the valve housing 2. According to the invention, the coil carrier 4 is formed from a suitable plastic and is therefore, magnetically, substantially non-conductive. Essentially, this means that the magnetic conductivity of the coil carrier 4 is negligibly small compared to the other parts forming the magnetic circuit M. The coil 3 is at least partially integrated into the coil carrier 4, so that the coil 3 is surrounded at least sectionally by the coil carrier 4. However, the coil 3 can also be completely integrated into the coil carrier, e.g., by the coil 3 being encapsulated by the plastic, so that only the electrical terminals (not shown) of the coil 3 suitably extend out of the coil carrier 4. The coil 3 and the coil carrier 4 therefore preferably form a common component.

Furthermore, a magnet armature 5 is arranged in the valve housing 2, which magnet armature is movable in an axial actuation direction in the direction of the valve axis A. The magnet armature 5 interacts magnetically with the coil 3 to actuate the valve and has for this purpose an armature end face 5A facing the coil 3. In the example shown, the magnet armature 5 is designed to be substantially cylindrical, having an axial first armature end face 5A, facing away from the coil 3, and an opposite, second armature end face 5B facing the coil 3, as well as having an armature peripheral surface 5U. On the magnet armature 5, e.g., on the second armature end face 5B in the example shown, a central cylindrical armature shaft 6 is arranged which is axially guided within a cylindrical opening of the valve housing 2, and which is movable in synchrony with the magnet armature 5 in the axial direction. The armature shaft 6 can be integrally formed with the magnet armature 5 or can be connected to the magnet armature 5 in another suitable manner.

Furthermore, a valve opening 9 is arranged in the valve housing 2 of the solenoid valve 1—in this case, in the first axial end E1 of the valve housing 2. The valve opening 9 can be opened and closed by means of a valve element 8 which can be actuated by the magnet armature 5. The valve element 8 is connected in this case to a substantially cylindrical valve shaft 7 which extends along the valve axis A in the interior of the valve housing 2. The armature shaft 6 and the valve shaft 7 can be rigidly connected to one another—for example, designed in one piece. However, these are preferably designed as separate components so that the movement of the armature shaft 6 can be decoupled from the movement of the valve shaft 7, as will be explained in more detail below. In the shown solenoid valve 1, a spring element 11 is also arranged within the valve housing 2, which exerts a restoring force on the valve shaft 7 and the valve element 8 connected thereto so that the valve element 8, when the solenoid valve 1 is in an unactuated state, returns to the closed position (in FIG. 1, on the left of the valve axis A) in order to close the valve opening 8.

To actuate the solenoid valve 1, an electrical current or an electrical voltage is applied to the coil 3, wherein a magnetic flux is generated by the coil 3. By means of the magnetic flux, an electromagnetic attractive force is exerted on the magnet armature 5, by means of which the magnet armature 5 is moved in the direction of actuation against the spring force of the spring element 11 in the direction of the coil 3. The armature shaft 6 connected to the magnet armature 5 presses on the valve shaft 7, as a result of which the valve element 8 is moved from the closed position in which the valve opening 9 is closed (to the left of the valve axis A) into the open position in which the valve opening 9 is released (to the right of the valve axis A), as indicated by the downward arrow along the valve axis A in FIG. 1. The available path between the closed position and the open position is also referred to as the valve lift.

As soon as the energy supply of the coil 3 is interrupted or reaches a sufficiently low level at which the restoring force of the spring element 11 (possibly supported by a compressive force in the combustion chamber acting on the underside of the valve element 8) exceeds the magnetic attraction force of the coil 3, the valve element 8 is displaced from the open position back into the closed position, as indicated by the upward arrow along the valve axis A in FIG. 1. Of course, stepless control or regulation of the valve lift would also be possible with appropriate control of the coil 3, so that valve positions can also be realized between the closed position and the open position. For example, it would be conceivable for the valve lift to be controlled or regulated steplessly, depending upon the applied coil voltage or the coil current. As a result, for example, the flow of the preferably gaseous fuel could be steplessly adjusted to a certain given combustion process.

In this case, the valve element 8 has a substantially conical valve disk 8a which, in the closed position, rests sealingly against a valve seat of the valve housing 2, as shown on the left of the valve axis A. In the open position, the valve element 8 is lifted off the valve seat in the actuation direction and releases a certain cross-section of the valve opening 9, as shown on the right of the valve axis A. As a result, a preferably pre-compressed medium such as a gaseous fuel can flow from a feed opening 10, arranged in this case in the side of the valve housing 2, through the interior of the valve housing 2 to the valve opening 9, as indicated by the arrows in FIG. 1. Of course, several feed openings 10 can also be provided. The medium can be supplied to the feed opening 10, for example, from a reservoir (not shown). The medium, e.g., the fuel, can be supplied through the valve opening 9 to, for example, a combustion chamber or a prechamber of an internal combustion engine (not shown).

In the example shown, the valve element 8 closes the valve seat from the outside, but the reverse variant would, of course, also be possible in which the valve element 8 is arranged entirely in the valve housing 2 and closes the valve seat from the inside—as, for example, in the case of a known needle valve. The valve seat also does not have to be arranged directly on the valve housing 2, but could, for example, be formed by a separate valve seat element, which is arranged on the valve housing 2. In this way, different materials for the valve housing 2 and the valve seat element can advantageously be used. Since the valve seat is a region subjected to relatively high mechanical stress due to the closing movement of the valve element 8, a valve seat ring made of a suitable low-wear material such as a hardened steel, for example, can be used as the valve seat element. In this case, a more cost-effective material can preferably be used for the rest of the valve seat housing 2.

The spring element 11, which biases the valve element 8 in the closed state in the direction of the valve seat, is designed in this case in the form of a helical spring which annularly surrounds the valve shaft 7. The helical spring is arranged in a space provided for this purpose in the valve housing 2, through which the gaseous fuel also flows. A shoulder on which a disk is arranged is formed on the valve shaft 7. The helical spring is arranged in the axial direction between the disk and a shoulder in the valve housing and exerts a spring force on the valve shaft 7 in the axial direction—in this case, upwards. Of course, other suitable spring elements 11 could also be used, such as disk springs, etc., and it would also be conceivable for the spring element 11 to have a non-linear spring characteristic in order to influence the opening characteristic of the solenoid valve, such as, for example, a progressive or degressive spring characteristic. Of course, the shown embodiment is to be understood only as an example, and other embodiments of the solenoid valve 1 would also be possible.

The valve shaft 7 and the valve element 8 are produced from a material which is suited to the temperatures, forces, and pressures to be expected that occur during operation of the solenoid valve 1. If, for example, a metallic material is selected, it should also be sufficiently corrosion-resistant with respect to the medium, e.g., a gaseous fuel, for which the solenoid valve 1 is intended.

If the electric coil 3 is supplied with energy, a magnetic flux is generated which forms a magnetic circuit M. The magnetic circuit M is closed by the valve housing 2 and the magnet armature 5, as is indicated in FIG. 1. As a result, a magnetic force acts on the magnet armature 5, through which the magnet armature 5 is axially attracted in the direction of the coil 3, whereby the valve element 8 is opened (or, vice versa, is closed). In this case, the magnetic flux of the magnetic circuit M runs radially within the coil 3 in a substantially axial direction through a first valve housing section 2a, axially below the coil 3 via a second valve housing section 2b extending radially outwards and adjoining the first valve housing section 2a. The magnetic flux runs from the second valve housing section 6b via an adjoining, radially outer, third valve housing section 6c, which also forms the valve housing outer wall of the valve housing 2. The magnetic circuit M is finally closed via the movable magnet armature 5 which, in the example shown, is arranged in the axial direction above the coil 3. The coil 3, including the coil carrier 4, is thereby seated in this case in an annular recess which is formed in the radial direction between the first and third valve housing sections 6a, 6c.

The valve housing 2, at least in the region around the coil 3 in which the magnetic circuit M forms, is made of a magnetically conductive material, such as a ferromagnetic metal, for example. However, the entire valve housing 2 is preferably made of the same ferromagnetic material, which facilitates the production of the valve housing 2. In an analogous manner, the magnet armature 5 is also made of a magnetically conductive material, at least in the region of the magnetic circuit 5, in order to close the magnetic circuit 5. However, the entire magnet armature 5 is preferably produced from the same material, which simplifies production.

However, the armature shaft 6 is preferably not magnetically conductive, at least in the region of the magnetic circuit 5, in order to produce no disruptive lateral magnetic forces on the armature shaft 6, which could have a negative effect on the actuating force of the valve element 8—for example, due to increased friction. The solenoid valve 1 is designed as a so-called dry-running valve in the shown example. This means that no separate lubricant is provided for lubricating the movable parts of the solenoid valve 1. In particular, if relatively dry gases are used as a fuel, it is advantageous, with such dry-running valves, that the friction between armature shaft 6 and the section of valve housing 2 in which the armature shaft 6 is guided (here, first housing section 6a) be minimized as much as possible. To achieve this, it is therefore advantageous, especially with dry-running valves, if no lateral forces, or as few lateral forces as possible, act on the magnet armature 5 and on the armature shaft 6, in order to reduce the friction in the guide of the armature shaft 6.

Preferably, at least one magnetically conductive flux element 12 is arranged in the valve housing 2, in order to guide at least part of the magnetic flux of the magnetic circuit M flowing over the magnetically conductive valve housing outer wall—in this case, the third housing section 2c—into the second armature end face 5B, facing the coil 3, of the magnet armature 5 (or vice versa, depending upon the direction of the magnetic flux). Preferably, at least 80%, particularly preferably at least 90%, and in particular 100%, of the magnetic flux is conducted via the flux element 12 into the magnet armature 5. In this case, the flux element 12 is here, in a radial direction, i.e., transversely to the actuation direction, arranged in a region adjoining the valve housing outer wall 2c of the valve housing 2. The flux element 12 extends in the valve housing 2 from the valve housing outer wall 2c inwards in the radial direction. In the actuation direction, the flux element 12 is arranged between the coil 3 and the magnet armature 5.

By using the flux element 12, a larger proportion of the magnetic flux can flow in the axial direction into the magnet armature 5, or the proportion of the magnetic flux flowing from the valve housing outer wall 2c in the radial direction into the magnet armature 5 is reduced. As a result, lateral forces acting on the magnet armature 5 can be reduced, whereby frictional forces between the armature shaft 6 and the valve housing 2 can be reduced. As a result of this reduction in the friction losses, the actuating speed of the valve element 8 can subsequently be increased, so that very dynamic opening and closing processes can be realized. It is particularly advantageous if the flux element 12 has a higher magnetic conductivity than the valve housing outer wall 2c. As a result, the magnetic resistance of the preferred magnetic circuit can be reduced, and consequently the proportion of the magnetic flux flowing into the armature end face 5B via the flux element 12 can be increased.

The arrangement of the flux element 12 can also be advantageously used to reduce the radial extent of the solenoid valve 1—in this case, for example, the diameter of the valve housing 2—with an essentially constant actuating force of the valve element 8, since the magnet armature 5 can be designed to be smaller in the radial direction. Alternatively, the actuating force of the valve element 8 could also be increased, given the same size of the solenoid valve 1. At the same time, the efficiency of force generation is also increased, so that a smaller dimensioned coil 3 can optionally be used. Preferably, the flux element 12, as in the example shown, is designed as a preferably closed flux ring, which is arranged in the radial direction between an end section 4a of the coil carrier 4 and the valve housing outer wall 2c. In the axial direction, the flux ring 12 is arranged between the coil 3 and the magnet armature 5. The flux element 12 is preferably made of a material having good magnetic conductivity, e.g., of the same material as the magnet armature 5 and/or the valve housing 2 or the magnetically conductive section of the valve housing 2.

According to the invention, an end section 4a, axially facing the magnet armature 5, of the coil carrier 4 is designed as an end stop for the magnet armature 5. As a result, the axial movement of the magnet armature 5 can be limited, in order to thereby limit the valve lift of the valve element 8. In the example shown, the flux element 12 is arranged in the radial direction between the end section 4a of the coil carrier 4 and the valve housing outer wall 2c. The flux element 12 in this case is arranged to be substantially flush with a step on the inner side of the valve housing outer wall 2c, and is arranged flush with an axial end face, facing the magnet armature 5, of the first housing section 2a. The end section 4a of the coil carrier 4 projects beyond the end face by a certain length l, as shown in FIG. 1. Due to the structural design of the coil carrier 4, including the end section 4a, this length l can be predetermined so that the valve lift can be easily limited, without separate components being required. The entire coil carrier 4, or at least the end section 4a, could, for example, be made of a suitable material—in particular, a plastic—with certain suspension and/or damping properties. As a result, the noise and the mechanical load on the magnet armature 5 and the end section 4a when the magnet armature 5 meets the end section 4a can be reduced. This is advantageous for reducing the noise emission and increasing the service life.

When the valve element 8 returns to the closed position from the open position after actuation of the solenoid valve 1, the valve element 8 generally strikes the valve seat due to the restoring force of the spring element 11. On the one hand, this can lead to undesired noise generation and, on the other, to increased mechanical stress on both the valve element 8 and the valve seat, which can lead to increased wear on the valve element 8 and/or the valve seat. This can be the case in particular with spring elements 11 with large restoring forces, which are advantageous for high closing speeds. In order to prevent this, pneumatic damping in the solenoid valve 1 is provided, according to a further advantageous embodiment of the solenoid valve 1. For this purpose, the valve housing 2 forms a cylinder in the region of the magnet armature 5, and the magnet armature 5 forms a piston which is axially movable in the cylinder. A compression space KR is formed between the first armature end face 5A, facing away from the coil 3, of the magnet armature 5 and an opposite valve housing wall 2d of the valve housing 2 in the actuation direction. In addition, in the magnet armature 5, at least one throttle opening 13 is arranged, which connects the first armature end face 5A to an opposite, second armature end face 5B. In addition, a suitable sealing element for sealing the compression chamber KR is preferably arranged on the peripheral surface 5U of the magnet armature 5—for example, in the form of a known piston sealing ring or O-ring. Preferably, in the valve housing 2, as shown in FIG. 1, a relief opening, and in particular a relief bore, is provided which connects the space below the magnet armature 5 to the space in which the spring element 11 is arranged. As a result, a pressure relief of the space below the magnet armature 5 is realized in order to prevent the movement of the magnet armature 5 being damped even when the solenoid valve 1 is opened. For a good pressure relief effect, the relief bore is preferably arranged such that it is flush with the throttle opening 13.

This results in a simple and effective damping of the magnet armature 5 during the closing of the solenoid valve 1, wherein the damping characteristic can be influenced by the structural design of the solenoid valve 1—in particular, by the size of the first armature end surface 5A—by the volume of the compression space KR, the effectiveness of sealing of the magnet armature 5 in the cylinder, and the number, the profile, and cross-section of the throttle opening(s) 13. The pneumatic damping allows the speed at which the valve element 8 strikes the valve seat to be reduced to preferably at most 0.5 m/s, so that the noise and the wear can be reduced. Preferably, the damping characteristic is selected such that a substantially undamped movement takes place at the beginning of the closing movement, and that the damping occurs only shortly before the closed position. This allows the solenoid valve 1 to be closed quickly and still achieve the smoothest possible contact with the valve seat. Rapid opening and closing of the solenoid valve 1 is advantageous for achieving a very accurate quantity control of the preferably gaseous medium, and for carrying out several sequential opening and closing operations in a short time.

Up to now, the armature shaft 6 and the valve shaft 7 were often rigidly connected to each other—for example, integrally formed or welded. In particular, with relatively large solenoid valves 1, as are used for example in large motors, the moving components of the solenoid valve 1—in particular, the magnet armature 5, the armature shaft 6, the valve shaft 7, and the valve element 8—have comparatively large masses, which cause non-negligible inertial forces when the solenoid valve 1 is actuated. In particular, due to the mass of the magnet armature 5 and the armature shaft 6, an inertial force which acts on the valve element 8 via the valve shaft 7 can therefore occur when closing the solenoid valve 1. In the example shown, when the valve element 8 strikes the valve seat in the closed position, this inertial force causes an additional tensile force to be exerted upwards, which can have a negative effect on the noise generation and on the wear of the valve element and/or the valve seat.

According to another advantageous embodiment of the solenoid valve 1, the armature shaft 6 and the valve shaft 7 are therefore designed to be separate from each other, wherein a buffer element 15 made of plastic is advantageously arranged between the armature shaft 6 and the valve shaft 7. Given the separate execution, the movement of the magnet armature 5, including armature shaft 6, can be decoupled from the movement of the valve element 8, including valve shaft 7, in the closing movement. As a result, the load on the valve element 8 and the valve seat can be reduced, because, when solenoid valve 1 is being closed, only the inertial force of the masses of the valve element 8 and of the valve shaft 7 still act on the valve element 8 and the valve seat. Given the arrangement of the buffer element 15, a direct, and in particular metallic, contact between the armature shaft 6 and the valve shaft 7 is prevented, so that the noise generation and also the wear on the contact surface can be minimized as a result.

The buffer element 15 is preferably made of a tribologically-optimized plastic, such as, for example, a plastic filled with polytetrafluoroethylene (PTFE), so that the lowest possible friction between the peripheral surface of the buffer element 15 and the valve housing 2 occurs. Particularly with dry-running valves without additional lubricant, this is advantageous, because this further improves the efficiency of the solenoid valve 1, and/or the actuating force can be increased. If the end section 4a of the coil carrier 4, as shown, is used as an end stop for the magnet armature 5, the buffer element 15 can also, advantageously, be designed to compensate for any temperature-dependent changes in the valve lift. For this purpose, a suitable material is used for the buffer element 15, and the buffer element 15 is dimensioned in such a way that the (maximum) valve lift, when the magnet armature 5 rests against the end stop of the coil carrier 4, is as constant as possible in relation to the temperature. It is sufficient in this case if the compensation is realized at least within a temperature range to be expected for the use of the solenoid valve 1.

Finally, it should be mentioned that the shown solenoid valve 1 is, naturally, to be understood only as an example, and is shown in simplified form in order to illustrate the basic structure and the mode of operation. The specific structural design, such as, for example, the dimensioning, material selection, design of the valve element 8, etc., is naturally the responsibility of the person skilled in the art and depends upon the field of application of the solenoid valve 1.

The invention claimed is:

1. A solenoid valve with a valve housing, in which an electric coil and a magnet armature are arranged, and with a valve element which can be actuated by the magnet armature in an axial actuation direction for opening and closing the solenoid valve, characterized in that the coil is arranged on a coil carrier, wherein an end section, axially facing the magnet armature, of the coil carrier is designed as an end stop for the magnet armature in order to limit an axial movement of the magnet armature, so as to limit a valve lift of the valve member, and that the coil carrier is formed from a plastic, wherein the coil is completely integrated into the coil carrier, wherein when the electric coil is supplied with energy, a magnetic flux is generated, which forms a magnetic circuit (M), which is closed by the valve housing and the magnet armature.

2. The solenoid valve according to claim 1, wherein the coil is encapsulated by the plastic.

3. The solenoid valve according to claim 1, wherein the coil generates a magnetic flux when the solenoid valve is actuated, said magnetic flux flowing to the magnet armature over a magnetically conductive valve housing outer wall of the valve housing, wherein a magnetically conductive flux element is provided in the valve housing, said flux element introducing at least part of the magnetic flux flowing over the valve housing outer wall into an armature end face, facing the coil, of the magnetic armature.

4. The solenoid valve according to claim 3, wherein the flux element is arranged, transversely to the actuation direction, between the valve housing outer wall and the end section of the coil carrier, and is arranged, in the actuation direction, between the coil and the magnet armature.

5. The solenoid valve according to claim 3, wherein the flux element is designed as a preferably closed flux ring.

6. The solenoid valve according to claim 3, wherein the flux element has a higher magnetic conductivity than the valve housing outer wall.

7. The solenoid valve according to claim 3, wherein the flux element has a cross-section in the form of a trapezoid, and preferably a rectangular trapezoid.

8. The solenoid valve according to claim 1, wherein the valve housing forms a cylinder in the region of the magnet armature, and the magnet armature forms a piston which is axially movable in the cylinder, wherein, in the actuation direction, a compression space (KR) is formed between a first armature end face, facing away from the coil, of the magnet armature and an opposite valve housing wall, wherein at least one throttle opening is arranged in the magnet armature and connects the first armature end face to an opposite, second armature end face.

9. The solenoid valve according to claim 8, wherein a sealing element for sealing the compression space (KR) is arranged on the peripheral surface of the magnet armature.

10. The solenoid valve according to claim 1, wherein a valve opening is provided in an axial end of the valve housing, and at least one feed opening for a preferably gaseous medium is provided in the valve housing, the feed opening being connected to the valve opening within the valve housing.

11. The solenoid valve according to claim 1, wherein the magnet armature has an armature shaft, and the valve element has a valve shaft which is separate from the armature shaft, wherein the magnet armature actuates the valve shaft via the armature shaft when the solenoid valve is actuated.

12. The solenoid valve according to claim 11, wherein a buffer element made of plastic is arranged between the armature shaft and the valve shaft.

13. The solenoid valve according to claim 12, wherein the buffer element is formed from a tribologically-optimized plastic, and preferably from a plastic that contains polytetrafluoroethylene.

14. The solenoid valve according to claim 1, wherein a spring element is arranged in the valve housing and exerts a restoring force on the valve element in order to hold the valve element in the closed position when the solenoid valve is in the non-actuated state.

15. An internal combustion engine having a cylinder head and at least one combustion chamber, wherein, on the cylinder head, at least one solenoid valve according to claim 1 is arranged in order to supply a preferably gaseous fuel to the combustion chamber or a prechamber upstream of the combustion chamber.

* * * * *